United States Patent [19]

D'Alayer de Costemor d'Arc

[11] Patent Number: 4,799,207

[45] Date of Patent: Jan. 17, 1989

[54] APPARATUS AND METHOD FOR MAINTAINING PROGRESSION OF RECOVERY OF RECORDED INFORMATION

[75] Inventor: Stephane D'Alayer de Costemor d'Arc, Brussels, Belgium

[73] Assignee: Staar, S.A., Belgium

[21] Appl. No.: 893,862

[22] Filed: Aug. 6, 1986

[30] Foreign Application Priority Data

Aug. 14, 1985 [BE] Belgium ............................... 215475

[51] Int. Cl.⁴ ............................................. G11B 27/36
[52] U.S. Cl. ..................................... 369/58; 360/74.4; 369/54; 358/342
[58] Field of Search ....................... 369/32-33, 369/47-48, 58; 365/50, 59; 360/32, 74.4; 358/907, 342

[56] References Cited

U.S. PATENT DOCUMENTS

| | | | |
|---|---|---|---|
| 2,921,992 | 1/1960 | Bick | 179/100.4 |
| 3,787,616 | 1/1974 | Falk et al. | 360/DIG. 1 |
| 3,963,860 | 6/1976 | Burrus | 178/6.6R |
| 3,973,080 | 8/1976 | Dickopp et al. | 360/DIG. 1 |
| 3,993,863 | 11/1976 | Leedom et al. | 360/DIG. 1 |
| 4,330,879 | 5/1982 | Wine | 369/33 X |
| 4,353,089 | 10/1982 | Winslow et al. | 369/48 X |
| 4,406,002 | 9/1983 | Wine | 369/58 X |
| 4,541,022 | 9/1985 | Katsuyama | 369/59 X |
| 4,546,462 | 10/1985 | Koishi et al. | 369/58 X |
| 4,580,253 | 4/1986 | Toshidome | 358/907 X |
| 4,611,319 | 9/1986 | Naito | 369/47 |
| 4,620,300 | 10/1986 | Ogawa | 369/47 X |
| 4,623,993 | 11/1986 | Schlosser | 369/33 |
| 4,623,994 | 11/1986 | Nabeshima et al. | 369/33 X |

FOREIGN PATENT DOCUMENTS

58-171730  10/1983  Japan ................................. 369/33

OTHER PUBLICATIONS

Translation of JP 58-171730.

*Primary Examiner*—Aristotelis M. Psitos
*Attorney, Agent, or Firm*—Leydig, Voit & Mayer

[57] ABSTRACT

Apparatus for reproducing information carried along a spiral track of a record disc having a controller to locate a reproduction element so that it follows the information track and to maintain a substantially linear reproduction speed as the reproduction element recovers the information recorded along the information track at a normal rhythm. The controller compares the progression of the recovery of the information with a time-based reference signal and delivers a control signal when a predetermined difference occurs indicative of a break in the rhythm of the progression of the recovery. The control signal corrects the relative movement between the record disc and the reproduction element to restore the rhythm of the progression of the recovery.

8 Claims, 3 Drawing Sheets

APPARATUS AND METHOD FOR MAINTAINING PROGRESSION OF RECOVERY OF RECORDED INFORMATION

TECHNICAL FIELD

The present invention relates to apparatus for reproducing information carried by a carrier, such as a record disc.

BACKGROUND ART

Information is recorded on record discs on one or more spiral tracks and is read by a reproduction element, such as a magnetic head or cell, or light ray. Mechanical and/or electronic means ensure relative movement between the reproduction element and the carrier to permit the detection of the information recorded on the carrier. In the case of record players for compact discs, the disc is driven in a rotational movement about its axis of symmetry while the reproduction element is displaced radially relative to the disc from the interior to the periphery. These movements are related in such a manner that the reproduction element follows the information track and the recovery of the information carried by the disc takes place at a constant linear reproduction speed in the reproduction mode.

As a result of damage, soiling of the carrier and/or the reproduction head, or poor detection or error in detection, a break may occur in the rhythm of the progression of the recovery of information recorded along the information track due to drop-out of the reproduction head from following the recorded track and the head may get "stuck" at the same position, with the result that the apparatus "repeats" information.

DISCLOSURE OF THE INVENTION

This phenomenon of repeating information is particularly unpleasant when encountered in the reproduction of sound recorded on audio discs, and the main object of the present invention is to eliminate the phenomenon by providing simple and reliable apparatus and circuitry to maintain the rhythm of the progression of the recovery of the information recorded along the tracks of the carrier.

To achieve this object, the invention is embodied in an apparatus, operating only in reproduction mode, having means for comparing the progression of the recovery of the information with a time-based reference signal to deliver a control signal when a predetermined difference in value is reached, indicative of a break in the rhythm of the progression of the recovery of the information, which is utilized to adjust the relative movement between the carrier and the reproduction element in such a manner as to correct their respective positions and restore the rhythm of the progression of the recovery.

BRIEF DESCRIPTION OF THE DRAWINGS

The preferred form of the invention and it's best mode will be described as applied to record players for compact discs. Other characteristics of apparatus embodying the subject invention will be apparent from the description of two preferred embodiments given below, in a non-limiting manner, with reference to the accompanying drawings, in which.

BEST MODE FOR CARRYING OUT THE INVENTION

Figure 1:
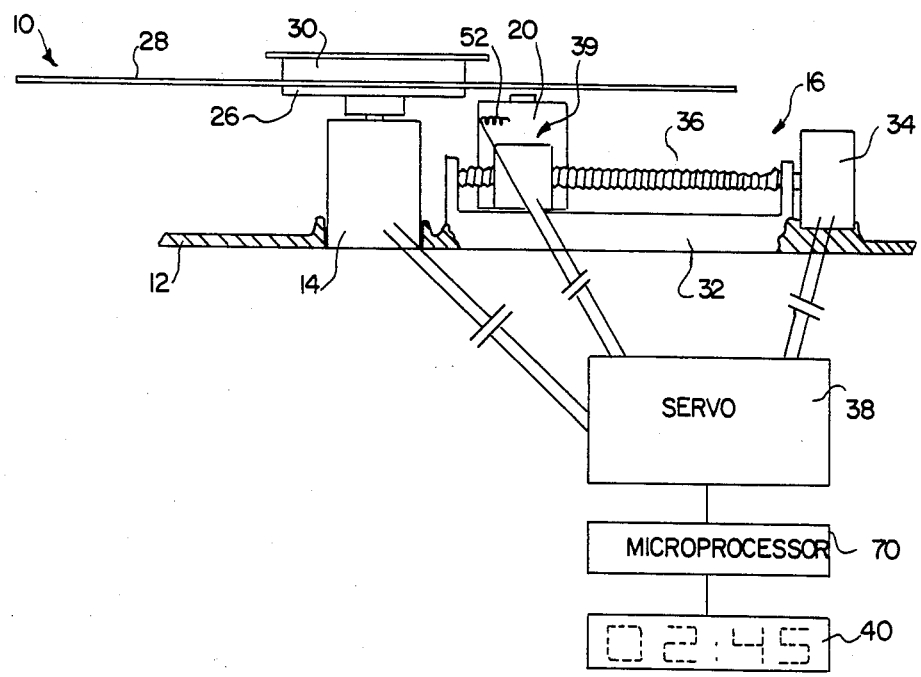
FIG. 1 is a diagrammatic illustration of the operation of a record player for compact discs.

A record player 10 comprises a chassis 12 to which are fixed a motor 14 and a guiding and driving system 16 for the reproduction head 20 which, in the case described, is an optical system comprising a laser.

The drive spindle of the motor 14 carries a turntable 26 on which a record disc 28 is positioned and held by means of a clamping magnet 30. With application of the appropriate voltage, the motor 14 ensures rotation of the record disc 28.

The guiding and driving system 16 comprises a guide surface 32 permitting the sliding of the reproduction head 20, and a motor 34 driving an endless drive screw 36, ensuring displacement of the head 20 with which it is engaged.

Motors 14 and 34 are connected to a control circuit 38, controlled by a microprocessor operating under program control in the reproduction mode, to control the rotary speed of the record disc 28 and the position of the reproduction head 20 so that the recovery of information carried on the surface of the record disc takes place at a linear reproduction speed.

With compact discs, the information is recorded along a spiral extending from the interior of the disc to its periphery.

The reproduction of information is effected by a laser beam detecting the presence or absence of depressions on the record and generating a series of 1s and 0s which, when they have been decoded and processed, reproduce the recorded audio signal.

The following of the track is also effected by means of a laser beam according to different methods, the common principle of which, however, is to measure the quantities of light reflected on a plurality of photoelectric cells 39 and then to process the result of these measurements to ensure that the reproduction beam is kept on the track.

In compact discs, the digital signals which are recorded along the tracks also include time information signals. According to a standard format, the digital signals are recorded in blocks, each block containing signals representing minutes and seconds from a starting point of the location of the block. Other types of information are typically included, for example, in the case of music recordings, relating to the duration of the disc and to each of the pieces of music which are recorded along the track. Once the digital signals have been decoded, the time information is transmitted to a numerical display device 40, enabling the user to know precisely, inter alia, the instantaneous position of the information being reproduced.

As illustrated in FIG. 1, the instantaneous position of the information being reproduced is 2 minutes, 45 seconds.

When the detection of the information carried by the record disc is either incomplete or erroneous due to surface defects, for example, scratches or dirt, the following of the track by the reproduction head becomes only approximate and errors then occur which can result in a failure of the recovery of the information to maintain the progression for accurate reproduction of recorded information. Errors are detected by the circuitry and corrections then effected.

According to the present invention, imminent dropout from the normal progression is detected either by determining that the number of corrections effected by the appropriate circuits within a given period of time exceed a predetermined threshold or, as in the most preferred embodiment, by verifying that the display of the instantaneous position is continuously updated according to a preset rhythm (in the present case, second by second).

Figure 2:
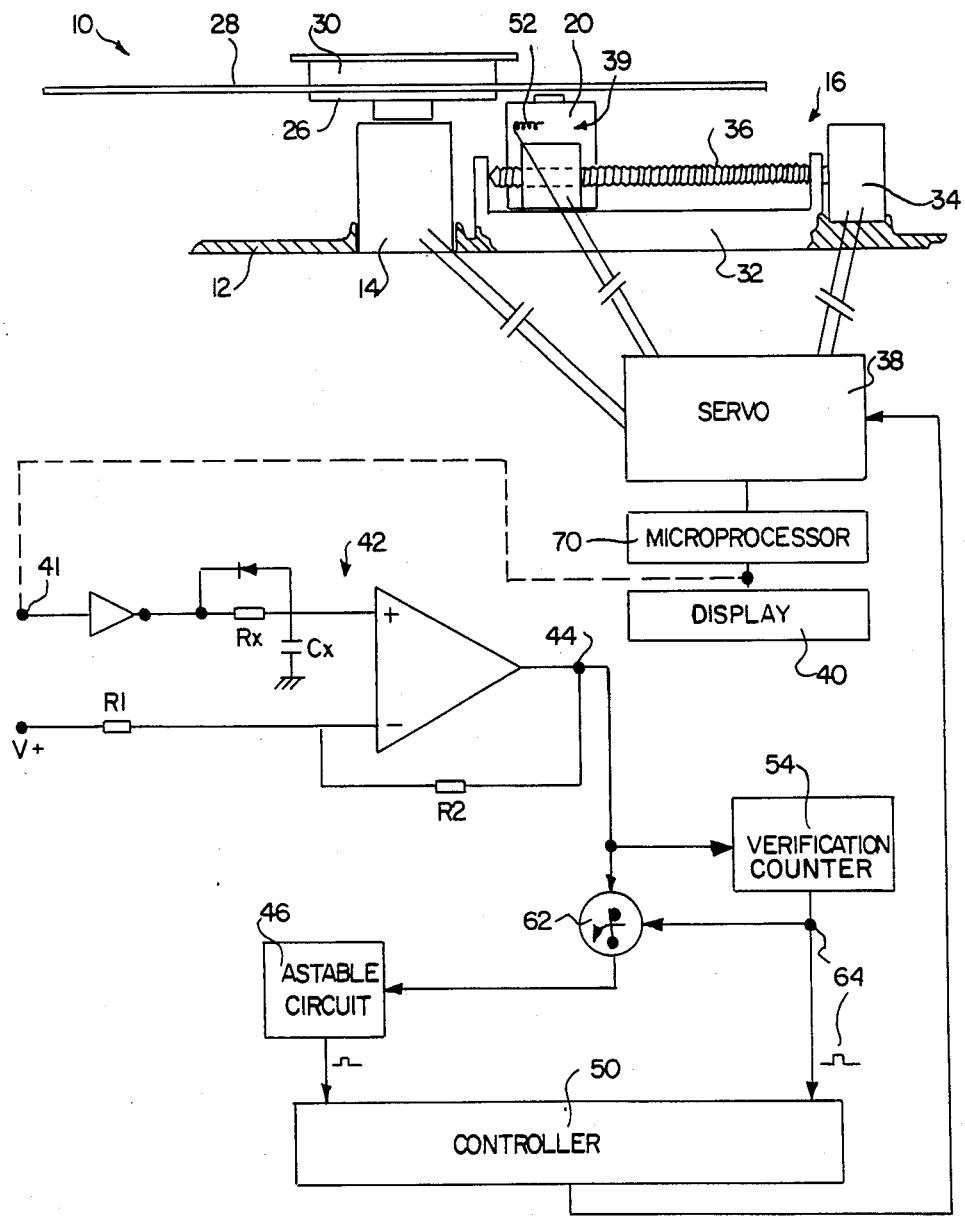
FIG. 2 is an illustration of an electronic circuit diagram for carrying out the invention with the apparatus illustrated in FIG. 1.

For carrying out this most preferred embodiment, the signal controlling the numerical display is diverted to the input 41 of a bistable circuit 42, which has a time constant, and the output 44, which transmits a signal if the instantaneous position has not been updated within a predetermined time (FIG. 2). In the present example, the updating of the display takes place every second and the time constant has a value of 1.3 seconds.

The signal generated when the display has not been updated within 1.3 seconds is then transmitted to a circuit 46 of the astable type, which generates a pulse having a predetermined characteristic. This pulse is then transmitted, by means of interface circuit 50, to the control circuit 38 to control displacement of the reproduction head 20. In a very simple embodiment, this signal may be a pulse of given duration which controls rotation of the drive screw 36 to ensure a given displacement of the reproduction head 20.

With a laser reproduction unit, the focusing lens, through which pass the incident rays reflected by the surface of the disc, is mounted on a moving contact controlled by circuit 22 by means of coils 52, the displacement of which beyond a given value controls the rotation of the endless drive screw 36. This displacement of the lens ensures detection of information over a given distance and the endless screw regularly undergoes a slight rotation to bring the moving contact into successive positions.

In this exemplary embodiment it is an advantage to apply the signal originating from circuit 50 to the circuit controlling the lens to guarantee a given displacement of the laser beam relative to the instantaneous position (for example, 2 seconds).

If, despite displacement of the reproduction head 20, circuit 38 again transmits a pulse representative of a break in the rhythm of the progression of the recovery of information, this pulse is added to the previous ones in verification counting circuit 54, which delivers a pulse when the count has reached a given number (for example, 8) within a predetermined period of time (for example, 16 seconds). By means of gate 62, pulse 64 blocks the transmission of the control pulse of the astable circuit 46, and, as a result of its characteristic, causes a greater displacement of the reproduction head by means of circuit 50. In the most preferred embodiment, it "kicks" the reproduction head to the beginning of the following piece of music.

Such a laser "kick" is selected because, from experience, it is considered that the large number of errors found within this predetermined period of time indicates, with satisfactory probability, that it will not be possible to effect satisfactory production at this part of the disc. As soon as the mode of reproduction at normal speed is abandoned, circuit 42 is rendered inactive.

Figure 3:
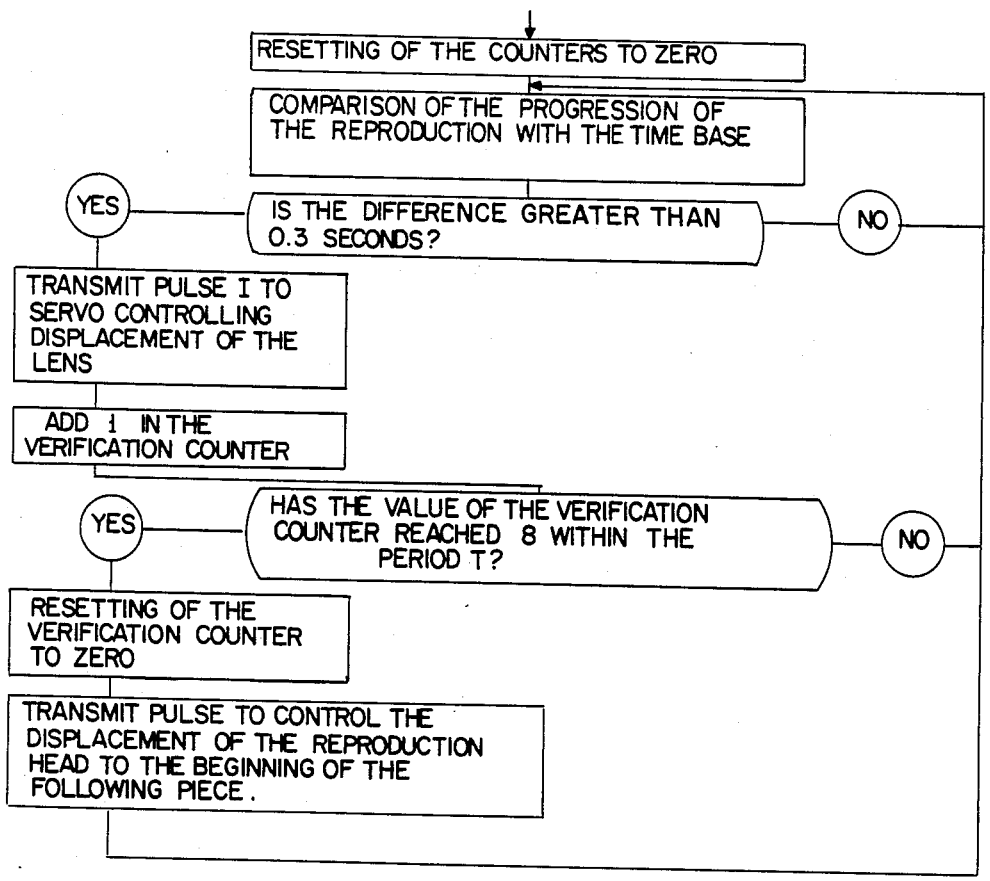
FIG. 3 is a diagram of an instruction program.

FIG. 3 illustrates diagrammatically a set of logical instructions realizing the steps previously described in such a manner as to use a microprocessor 70.

A time-based circuit controlled by the microprocessor 70 compares the progression of the recovery of the information with a reference value and, when the result of this comparison exceeds a predetermined value, such as 0.3 seconds, an instruction controls the displacement of the reproduction head by a given value.

As in the previous example, a verification counter is then incremented by one unit.

If the value of this counter exceeds the number 8 within a period of time T (for example, 16 seconds), the counter is then reset to zero and a pulse is transmitted to the microprocessor 70 to cause it to effect the positioning of the reproduction head at the beginning of the following piece, as shown in FIG. 2.

What is claimed is:

1. Apparatus which reproduces information recorded along a track of a record disc, the information including primary information and successive real time information signals quantitatively and cumulatively representing successive instantaneous positions of the primary information in real time from a starting point, said apparatus including:

a reproduction element which recovers the information recorded along the track;

motor-driven means providing relative movement between the record disc and said reproduction element, and controller means for controlling said motor-driven means to locate said reproduction element so that it follows the information track and to maintain a substantially linear reproduction speed enabling said reproduction element to recover the information recorded along the information track at a normal rhythm set by a time-based reference value, said controller means including:

means for automatically and continuously monitoring the rhythm of the progression of the information recovered from the track by said reproduction element by comparing (a) each interval of time between successive real time information signals with (b) the time-based reference value setting the normal rhythm said monitoring means including means for delivering a control signal when a predetermined difference indicative of a break occurs in the rhythm of the progression of the recovered information based upon the comparison; and means responsive to the control signal for controlling the motor-driven means to make a first adjustment in the relative movement between the record disc and said reproduction element so that said reproduction element follows the track beyond the break to restore the rhythm of the progression of the recovered information;

2. Apparatus according to claim 1, said controller means including circuit means for counting, within a predetermined period of time, the number of control signals delivered by said monitoring means and for generating a signal to said controlling means to make an adjustment having a magnitude larger than said first adjustment in the relative movement between the record disc and said reproduction element if this number exceeds a predetermined number.

3. Apparatus according to claim 2 wherein the recorded information is in the form of successive pieces of music and the signal representing a greater correction kicks the position of the reproduction element to the beginning of the following piece of music.

4. Apparatus according to claim 1, said controller means including means responsive to the control signal ensuring that the first adjustment of the reproduction element in relation to the record disc is of a predetermined amplitude.

5. Apparatus according to claim 1, wherein said motor-driven means includes means for rotating the record disc and means for displacing said reproduction element, and wherein said reproduction element is a laser beam unit.

6. Apparatus according to claim 5 wherein optical advance of the laser beam of the unit is produced by a movable lens through which it passes and/or by the displacement of the unit itself.

7. Apparatus according to claim 6 wherein the control signal for correcting the relative movement of the record disc and the reproduction element to restore the rhythm of the progression of the recovered real time information is applied to circuits controlling the optical advance of the laser beam.

8. A method of monitoring and correcting the relative movement of a reproduction element and a carrier having information recorded along a track on the carrier, the information including primary information and real time information quantitatively and cumulatively representing progression of instantaneous positions of the primary information in real time from a starting point, said method comprising the steps of:

providing a time-based reference value;

automatically and continuously monitoring the rhythm of the progression of the real time information recovered from the track by the reproduction element by comparing each time interval between successive instantaneous positions with the reference value;

delivering a control signal when a difference of predetermined value indicates a break in the rhythm of the recovered real time information based upon the comparison; and making a first adjustment in the relative movement between the carrier and the reproduction element so that the reproduction element follows the track beyond the break to restore the rhythm of the progression of the recovered real time information.

* * * * *